(12) United States Patent
Fleischmann et al.

(10) Patent No.: US 12,404,945 B2
(45) Date of Patent: Sep. 2, 2025

(54) VALVE WITH CONFIGURABLE DEFAULT POSITION

(71) Applicant: Modine Manufacturing Company, Racine, WI (US)

(72) Inventors: Zachary Fleischmann, Waterford, WI (US); Michael Kis, Sturtevant, WI (US)

(73) Assignee: MODINE MANUFACTURING COMPANY, Racine, WI (US)

( * ) Notice: Subject to any disclaimer, the term of this patent is extended or adjusted under 35 U.S.C. 154(b) by 108 days.

(21) Appl. No.: 18/126,175

(22) Filed: Mar. 24, 2023

(65) Prior Publication Data

US 2023/0304597 A1 Sep. 28, 2023

Related U.S. Application Data

(60) Provisional application No. 63/323,866, filed on Mar. 25, 2022.

(51) Int. Cl.
*F16K 31/04* (2006.01)
*F16K 11/085* (2006.01)
(Continued)

(52) U.S. Cl.
CPC ........ *F16K 31/042* (2013.01); *F16K 11/0853* (2013.01); *G05D 7/0623* (2013.01); *F16K 37/0041* (2013.01)

(58) Field of Classification Search
CPC ...... G05D 7/0623; G05D 7/0617–0694; F16K 11/0853; F16K 31/042; F16K 37/0041;
(Continued)

(56) References Cited

U.S. PATENT DOCUMENTS 2,271,911 A * 2/1942 Brisbane .............. G05D 7/0635
200/81.5
4,533,114 A 8/1985 Cory et al.
(Continued)

FOREIGN PATENT DOCUMENTS

| EP | 3502531 A1 | 6/2019 |
|---|---|---|
| KR | 101259450 B1 | 4/2013 |
| WO | 99/60291 A1 | 11/1999 |

OTHER PUBLICATIONS

Vacuum Research Corp. Operating Instructions for Throttle and Motorized Valves. Published Mar. 8, 2014. Available online at https://www.vacuumresearch.com/pdfs/partsnmans/ThrottleMasterandMotorizedValveNOpositionerInstructions.pdf (4 pages).
(Continued)

*Primary Examiner* — Craig J Price
(74) *Attorney, Agent, or Firm* — Michael Best & Friedrich LLP

(57) ABSTRACT

A valve including a housing, a motor within the housing, and a pinout configuration with an electrical contact. The electrical contact is configured to receive and transmit signals. The valve also includes a motor controller that receives power at the valve, receives a control message, and characterizes the control message as a first type. In response to characterizing the control message as the first type, the motor controller controls the motor to set the valve to a first position in response to determining that the electrical contact is electrically closed and controls the motor to set the valve to a second position in response to determining that the electrical contact is electrically open.

20 Claims, 7 Drawing Sheets

(51) Int. Cl.
*G05D 7/06* (2006.01)
*F16K 37/00* (2006.01)

(58) Field of Classification Search
CPC . F16K 11/0873; F16K 11/0876; H02K 11/30; H02K 11/33; H02K 5/22; H02K 5/225; F01P 2007/146; F01P 7/16
USPC .......................... 361/15–116; 310/71, 36–38
See application file for complete search history.

(56) References Cited

U.S. PATENT DOCUMENTS

| | | | |
|---|---|---|---|
| 5,422,808 A | 6/1995 | Catanese, Jr. et al. | |
| 5,947,189 A | 9/1999 | Takeuchi et al. | |
| 6,186,471 B1* | 2/2001 | Genga | F16K 31/046 251/71 |
| 6,239,991 B1 | 5/2001 | Ajro et al. | |
| 6,250,323 B1* | 6/2001 | Genga | F16K 31/046 251/129.01 |
| 6,290,207 B1* | 9/2001 | Genga | F16K 31/046 251/174 |
| 6,371,440 B1* | 4/2002 | Genga | F16K 31/046 251/249.5 |
| 6,460,567 B1 | 10/2002 | Hansen, III et al. | |
| 7,523,916 B2 | 4/2009 | Fenton | |
| 8,967,199 B2 | 3/2015 | Blieske et al. | |
| 9,567,893 B2 | 2/2017 | Kis et al. | |
| 10,316,730 B2 | 6/2019 | Kis et al. | |
| 11,280,424 B2 | 3/2022 | Weiss et al. | |
| 2011/0220042 A1 | 9/2011 | Suzuki | |
| 2012/0205171 A1 | 8/2012 | Takishita et al. | |
| 2015/0176469 A1 | 6/2015 | Kis et al. | |
| 2016/0273671 A1 | 9/2016 | Chang et al. | |
| 2019/0072200 A1 | 3/2019 | Chen | |
| 2019/0093543 A1 | 3/2019 | Dutta et al. | |
| 2019/0178404 A1* | 6/2019 | Zhang | F25B 49/00 |
| 2019/0271258 A1 | 9/2019 | Mendez Abrego et al. | |
| 2020/0378517 A1 | 12/2020 | Weiss et al. | |
| 2021/0140556 A1* | 5/2021 | Zhang | F25B 41/35 |
| 2022/0412479 A1 | 12/2022 | Baker et al. | |

OTHER PUBLICATIONS

Belimo ZoneTight™ Zone Valves Technical Documentation. Dated Nov. 18, 2015. Retrieved from URL:http://www.kele.com/Catalog/04%20Control%20Valves/PDFs/ZoneTight_Tech_Doc.pdf (28 pages).
Plast-O-Matic Valves, Inc. Series EBVA Electric Actuators for 2-Way and 3-Way Ball Valves w/ Direct Manual Override, Visual Position Indicator, CE/IP 65 type Housing. Version dated Feb. 16, 2015. Available online at https://web.archive.org/web/20150216122020/https://plastomatic.com/ebva-details.html (7 pages).
International Search Report and Written Opinion for Application No. PCT/US2023/016281 dated Jul. 21, 2023 (17 pages).

* cited by examiner

VALVE WITH CONFIGURABLE DEFAULT POSITION

RELATED APPLICATIONS

This application claims the benefit of priority to U.S. Provisional Patent Application No. 63/323,866, filed on Mar. 25, 2022, the entire content of which is hereby incorporated by reference.

FIELD OF THE INVENTION

The present invention relates to a valve, and more specifically, a valve having a configurable default, error position.

SUMMARY

Valves are used to regulate, direct, or control the flow of a fluid and/or gas by opening, closing, or partially obstructing various passageways within a housing of the valve. Vehicles typically include a plurality of valves to control the movement of various fluids throughout the vehicle. Valves are configured to be driven by a motor to direct the flow of fluid and/or gas through the various passageways. In the event of a control failure, valves may be set to a default position to regulate fluid, however, known designs may be met with position customization and power consumption constraints.

The disclosure provides, in one aspect, a valve including a housing, a motor within the housing, and a pullout configuration with an electrical contact. The electrical contact receives and transmits signals. The valve also includes a motor controller that receives power at the valve, receives a control message, and characterizes the control message. In response to characterizing the control message as a first type, the motor controller controls the motor to set the valve to a first position in response to determining that the electrical contact is electrically closed and controls the motor to set the valve to a second position in response to determining that the electrical contact is electrically open.

The disclosure provides, in another aspect, a method for controlling a position of a valve. The method includes receiving power at the valve, receiving a control message, and characterizing, via the motor controller, the control message as a first type. In response to characterizing the control message as the first type, the method includes controlling, via the motor controller, the motor to set the valve to a first position in response to determining that an electrical contact is electrically closed and controlling, via the motor controller, the motor to set the valve to a second position in response to determining that the electrical contact is electrically open.

Other aspects of the invention will become apparent by consideration of the detailed description and accompanying drawings.

DETAILED DESCRIPTION OF THE DRAWINGS

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Figure 1A:
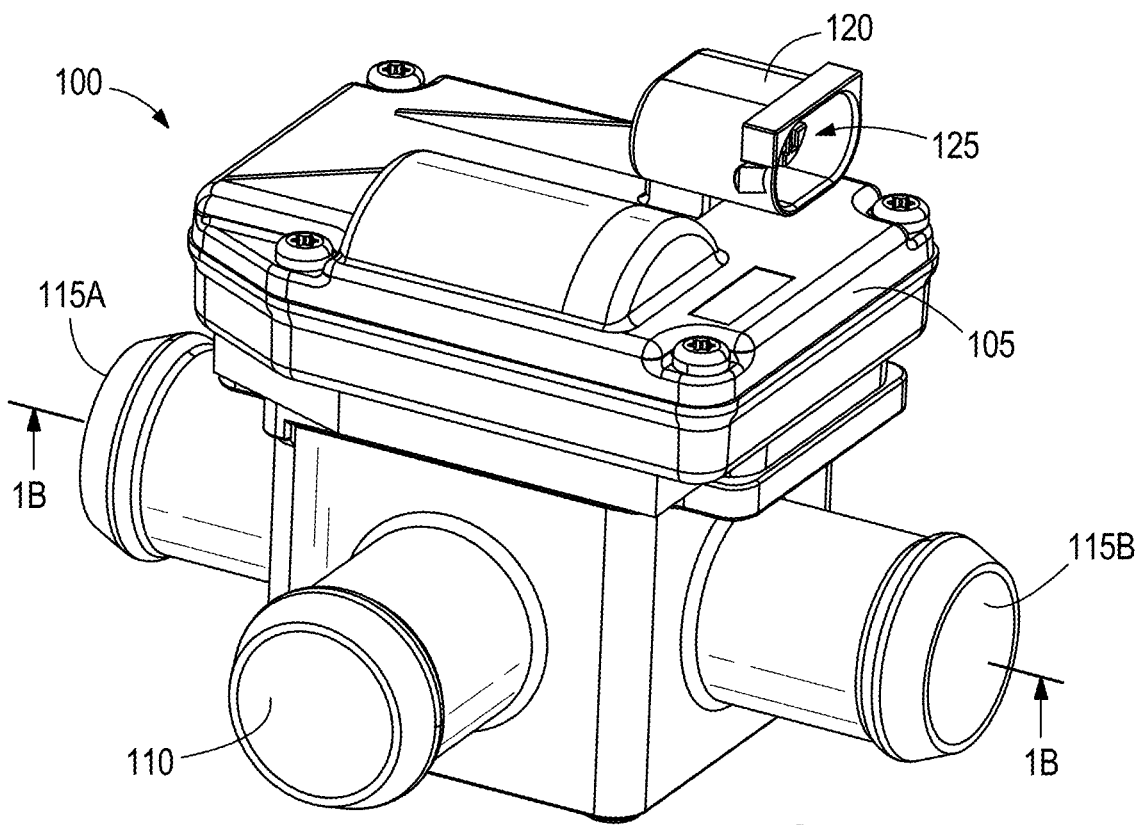
FIG. 1A illustrates a three-way valve including an electrical connector, according to one embodiment.

FIG. 1A illustrates a valve 100, according to some embodiments. In the illustrated embodiment, the valve 100 is a three-way valve. The valve 100 includes a housing 105, a main chamber (FIG. 1B) within the housing 105, a first tube 110, a second tube 115A, and a third tube 115B. The first tube 110, the second tube 115A, and the third tube 115B are in communication with the main chamber of the housing 105 to define passageways for fluid and/or gas to flow through the valve 100. The valve 100 also includes an electrical port 120. In the illustrated embodiment, the electrical port 120 includes a pinout configuration 125 with a plurality of electrical connectors (further described below in reference to FIGS. 4-5B). In some embodiments, the valve 100 is mechanically coupled to an external device via the electrical port 120 and is electrically coupled to the external device via the pinout configuration 125. The pinout configuration 125 receives and transmits control signals from the external device to the components of the valve 100. In some embodiments, the pinout configuration 125 receives and transmits power to the valve 100. In some embodiments, the valve 100 is positioned within a fluid system and is fluidly coupled to a pump. The pump may be positioned within a vehicle system. In other embodiments, the valve 100 is physically and/or operatively connected the pump, a fan, a compressor, or any other suitable component of the vehicle system mechanically via the electrical port 120. The valve 100 is physically and/or operatively connected the pump, a fan, a compressor, or any other suitable component of the vehicle system electrically via the pinout configuration 125.

Figure 1B:
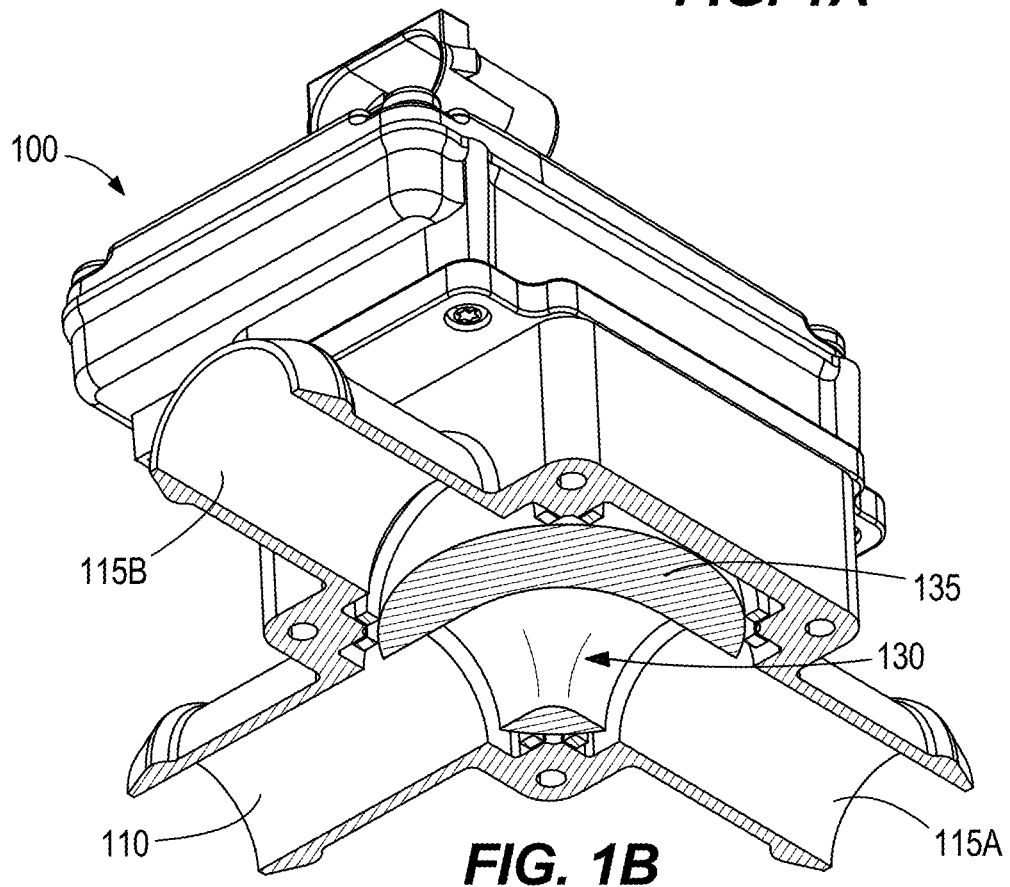
FIG. 1B is a cross-sectional view of the three-way valve of FIG. 1A, according to one embodiment.

FIG. 1B is a cross-sectional view of the valve 100, according to some embodiments. In the illustrated embodiment, the first tube 110, the second tube 115A, and the third tube 115B are in communication with a main chamber 130 of the valve 100. The main chamber 130 may be similar to the main chamber described above in reference to FIG. 1A. The main chamber 130 houses interior components of the valve 100. The valve 100 also includes a central component 135 within the main chamber 130. The central component 135 is actuated by a motor (further described below in reference to FIG. 4) to rotate the central component 135 and direct the flow of fluid and/or gas from the first tube 110, to the second tube 115A, and/or to the third tube 115B. For example, the central component 135 is positioned to direct the flow of fluid and/or gas from the first tube 110 to the second tube 115A. In some examples, the central component 135 is positioned to direct the flow of fluid and/or gas from the first tube 110 to the third tube 115B. In other examples, the central component 135 is positioned to direct the flow of fluid and/or gas from the second tube 115A and the third tube 115B. In the illustrated embodiment, the central component 135 is a rotary ball. In other embodiments, the valve 100 could be reconfigured to include elements of other types of valves such as, but not limited to, a poppet valve, a check valve, a thermal mixing valve, etc.

Figure 2A:
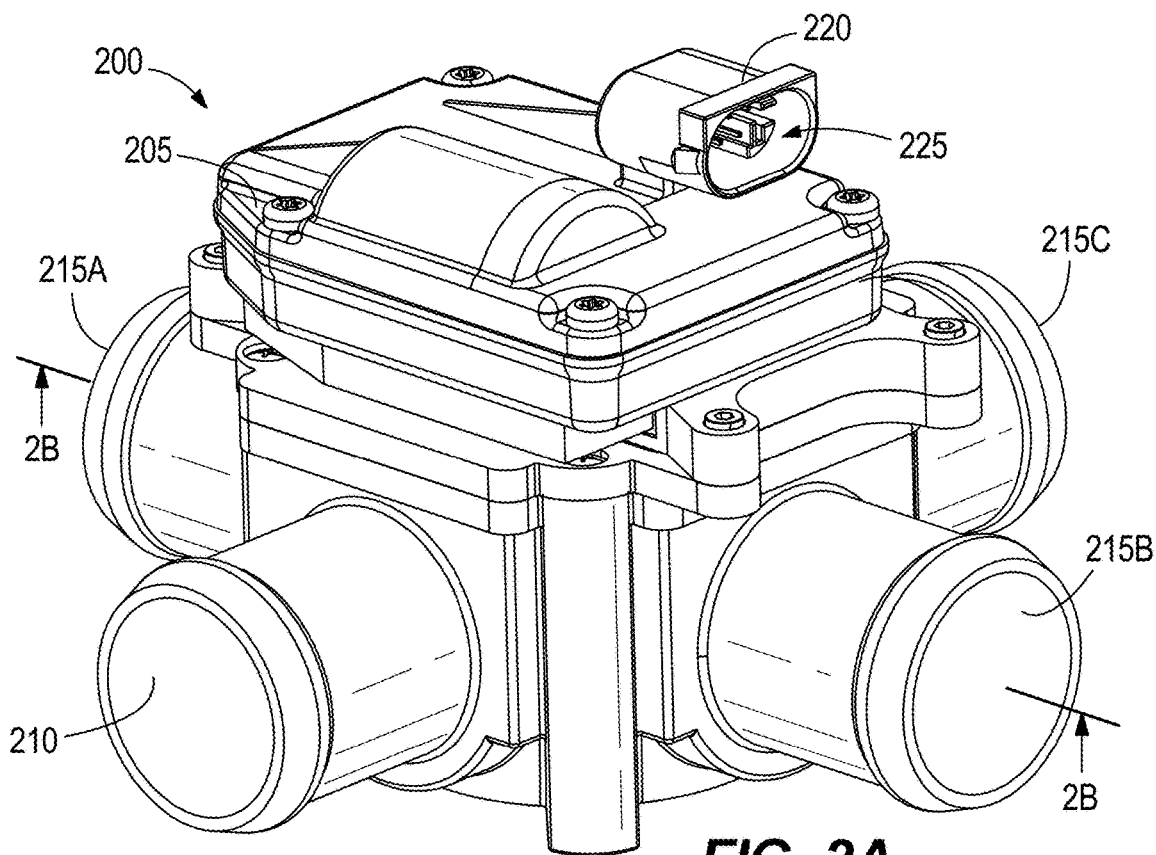
FIG. 2A illustrates a four-way valve including an electrical connector, according to one embodiment.

FIG. 2A illustrates a valve 200, according to some embodiments. In the illustrated embodiment, the valve 200 is a four-way valve. The valve 200 may include similar components to the valve 100 described above with reference to FIG. 1A. As illustrated in FIG. 2A, the valve 200 includes a housing 205, a main chamber (FIG. 2B) within the housing 205, a first tube 210, a second tube 215A, a third tube 215B, and a fourth tube 215C. The first tube 210, the second tube 215A, the third tube 215B, and the fourth tube 215C are in communication with the main chamber of the housing 205 to define passageways for fluid and/or gas to flow through the valve 200. The valve 200 also includes an electrical port 220. In the illustrated embodiment, the electrical port 220 includes a pinout configuration 225 with a plurality of electrical connectors (further described below in reference to FIGS. 4-5B). In some embodiments, the valve 200 is mechanically and electrically coupled to an external device via the electrical port 220 and the pinout configuration 225. The pinout configuration 225 receives and transmits control signals from the external device to the components of the valve 200. In some embodiments, the pinout configuration 225 receives and transmits power to the valve 200. In some embodiments, the valve 200 is positioned within fluid system and is fluidly coupled to a pump. The pump may be positioned within a vehicle system. In other embodiments, the valve 200 is physically and/or operatively connected the pump, a fan, a compressor, or any other suitable component of the vehicle system mechanically via the electrical port 220. The valve 200 is physically and/or operatively connected the pump, a fan, a compressor, or any other suitable component of the vehicle system electrically via the pinout configuration 225.

Figure 2B:
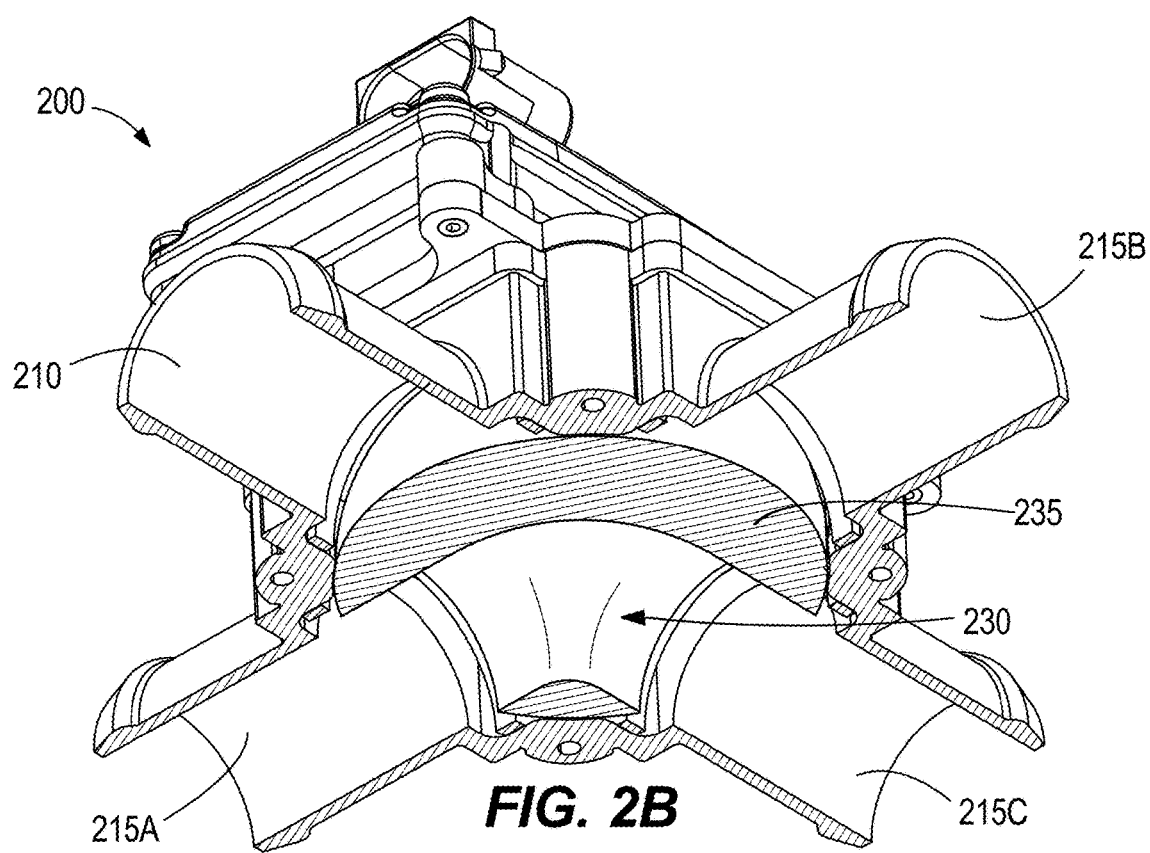
FIG. 2B is a cross-sectional view of the four-way valve of FIG. 2A, according to one embodiment.

FIG. 2B is a cross-sectional view of the valve 200, according to some embodiments. In the illustrated embodiment, the first tube 210, the second tube 215A, the third tube 115B, and the fourth tube 115C are in communication with a main chamber 230 of the valve 200. The main chamber 230 houses interior components of the valve 200. The valve 200 also includes a central component 235 within the main chamber 230. The central component 235 is actuated by a motor (further described below in reference to FIG. 4) to rotate the central component 235 and direct the flow of fluid and/or gas from the first tube 210, to the second tube 215A, the third tube 215B, and/or the fourth tube 215C. For example, the central component 235 is positioned to direct the flow of fluid and/or gas from the first tube 210 to the second tube 215A. In some examples, the central component 235 is positioned to direct the flow of fluid and/or gas from the first tube 210 to the third tube 215B. In some examples, the central component 235 is positioned to direct the flow of fluid and/or gas from the first tube 210 to the fourth tube 215C. In other examples, the central component 235 is positioned to direct the flow of fluid and/or gas between any of the second tube 115A, the third tube 115B, and the fourth tube 115C. In the illustrated embodiment, the central component 235 is a rotary ball. In other embodiments, the valve 200 could be reconfigured to include elements of other types of valves such as, but not limited to, a poppet valve, a check valve, a thermal mixing valve, etc.

Figure 3A:
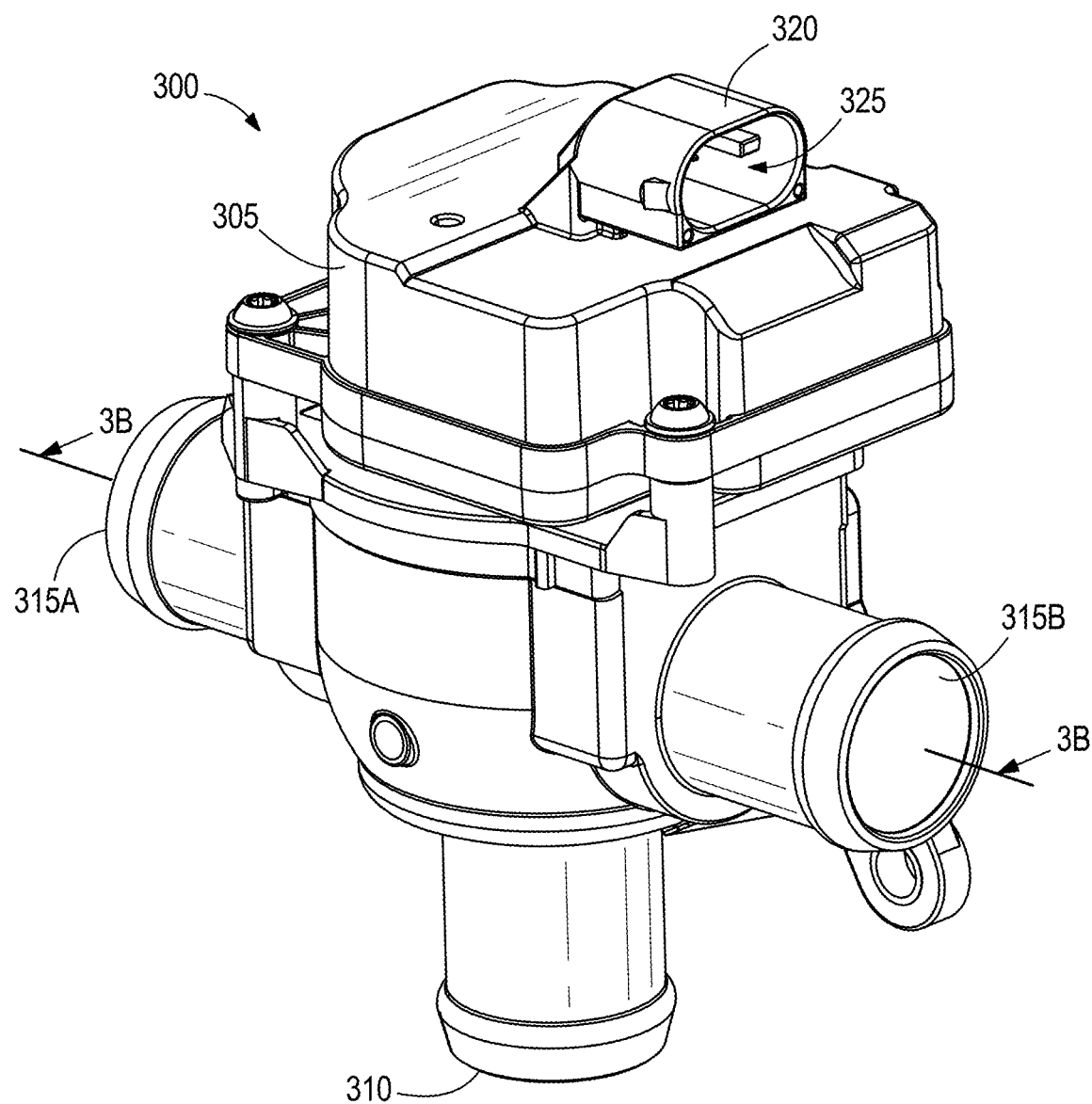
FIG. 3A illustrates a three-way valve including an electrical connector, according to one embodiment.

FIG. 3A illustrates a valve 300, according to some embodiments. In the illustrated embodiment, the valve 300 is a vertical three-way valve. It should be understood that the valve 200 may include similar components to the valve 100 described above with reference to FIG. 1A. As illustrated in FIG. 3A, the valve 300 includes a housing 305, a main chamber (FIG. 3B) within the housing 305, a first tube 310, a second tube 315A, and a third tube 315B. The first tube 310, the second tube 315A, and the third tube 315B are in communication with the main chamber of the housing 305 to define passageways for fluid and/or gas to flow through the valve 300. The valve 300 also includes an electrical port 320. In the illustrated embodiment, the electrical port 320 includes a pinout configuration 325 with a plurality of electrical connectors (further described below in reference to FIGS. 4-5B). In some embodiments, the valve 300 is mechanically and electrically coupled to an external device via the electrical port 320 and the pinout configuration 325. The pullout configuration 325 receives and transmits control signals from the external device to the components of the valve 300. In some embodiments, the pullout configuration 325 receives and transmits power to the valve 300. In some embodiments, the valve 300 is positioned within fluid system and is fluidly coupled to a pump. The pump may be positioned within a vehicle system. In other embodiments, the valve 300 is physically and/or operatively connected the pump, a fan, a compressor, or any other suitable component of the vehicle system mechanically via the electrical port 320. The valve 300 is physically and/or operatively connected the pump, a fan, a compressor, or any other suitable component of the vehicle system electrically via the pinout configuration 325.

Figure 3B:
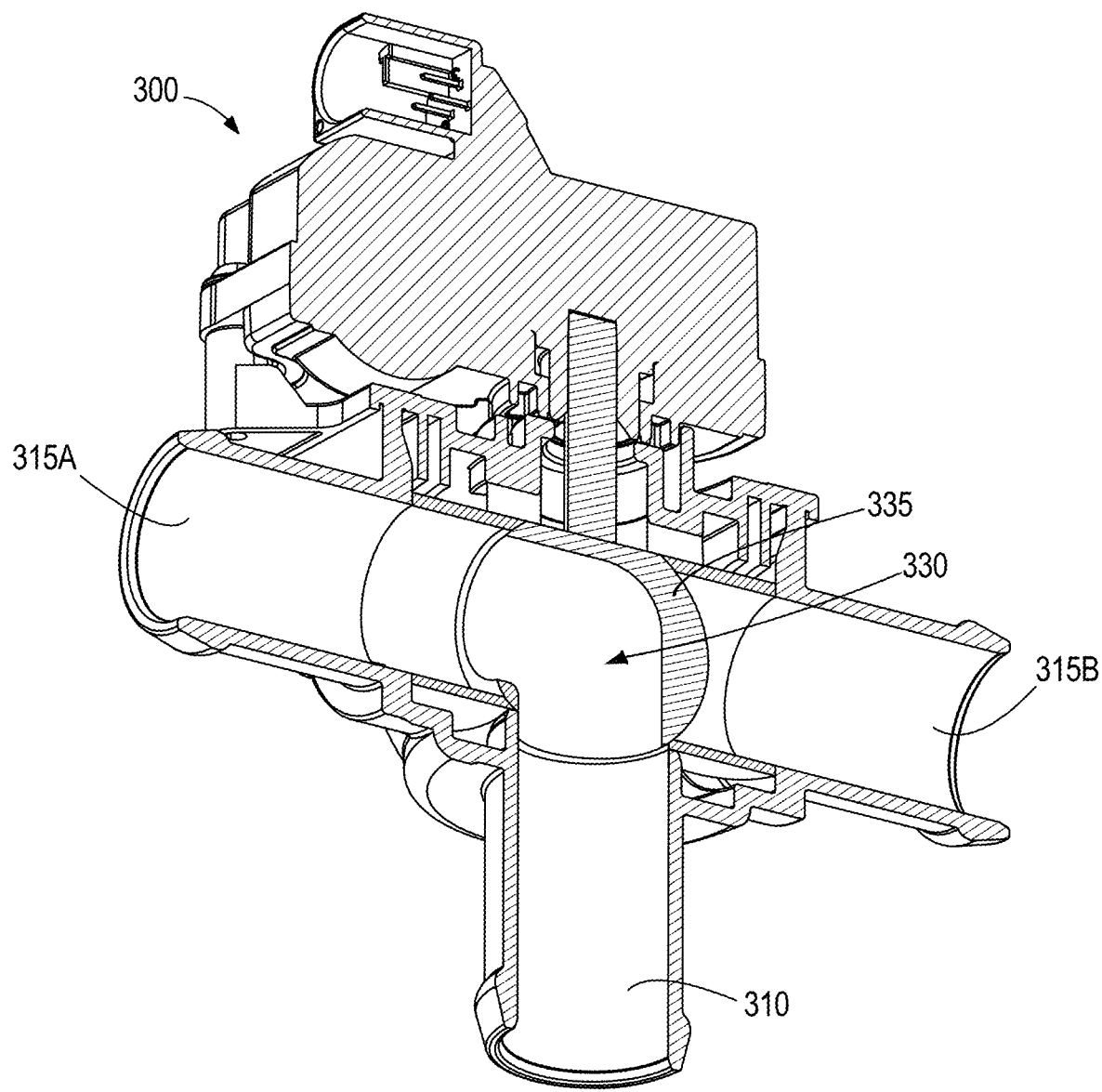
FIG. 3B is a cross-sectional view of the three-way valve of FIG. 3A, according to one embodiment.

FIG. 3B is a cross-sectional view of the valve 300, according to some embodiments. In the illustrated embodiment, the first tube 310, the second tube 315A, and the third tube 315B are in communication with a main chamber 330 of the valve 300. The main chamber 330 houses interior components of the valve 300. The valve 300 also includes a central component 335 within the main chamber 330. The central component 335 is actuated by a motor (further described below in reference to FIG. 4) to rotate the central component 335 and direct the flow of fluid and/or gas from the first tube 310, to the second tube 315A, and/or the third tube 315B. For example, the central component 335 is positioned to direct the flow of fluid and/or gas from the first tube 310 to the second tube 315A. In some examples, the central component 335 is positioned to direct the flow of fluid and/or gas from the first tube 310 to the third tube 315B. In other examples, the central component 335 is positioned to direct the flow of fluid and/or gas between the second tube 315A and the third tube 315B. In the illustrated embodiment, the central component 335 is a rotary ball. In other embodiments, the valve 300 could be reconfigured to include elements of other types of valves such as, but not limited to, a poppet valve, a check valve, a thermal mixing valve, etc.

Figure 4:
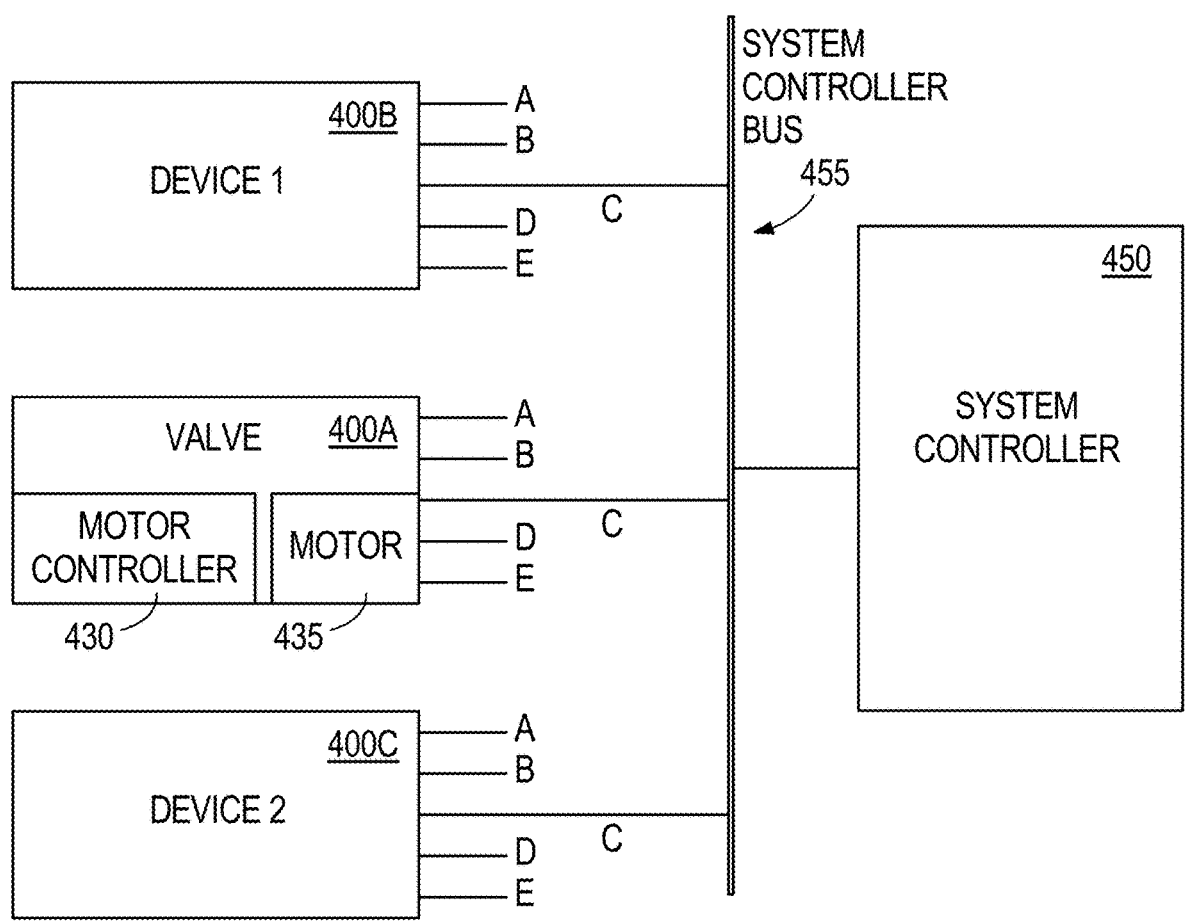
FIG. 4 is a block diagram of a system for controlling a valve, according to one embodiment.

FIG. 4 is a block diagram illustrating a system for controlling a valve 400A. The valve 400A may be any one of the valves 100, 200, 300, as described above. Although illustrated alone, the valve 400A is positioned within fluid system and is fluidly coupled to a pump. The pump is positioned within a vehicle system such as, for example, a cooling system of the vehicle. The vehicle system may encompass various types and designs of vehicles. For example, the vehicle may be an automobile, an electric automobile, a motorcycle, a truck, a bus, and others. The valve 400A includes a motor controller 430 and a motor 435 in electrical contact with the pullout configuration (e.g., the pinout configuration 125, 225, 325). The motor 435 is configured to rotate the central component of the valve 400A between at least a first position and a second position. The motor 435 is an electrical motor, such as but not limited to a direct-current motor operable at variable speeds. In some embodiments, the motor 435 is a brushless direct-current (BLDC) motor. In other embodiments, the motor 435 can be a variety of other types of motors, including but not limited to a brush DC motor, a stepper motor, a synchronous motor, or other direct-current or alternating-current motors.

The motor controller 430 is electrically connected to the motor 435 and provides one or more control signals to operate the motor 435. The motor controller 430 includes a plurality of electrical and electronic components that provide power, operational control, and protection to the components and modules within the motor controller 430 and/or the motor 435. For example, the motor controller 430 includes, among other things, a processing unit (e.g., a microprocessor, a microcontroller, or another suitable programmable device) and a memory unit. In some embodiments, the motor controller 430 is implemented partially or entirely on a semiconductor (e.g., a field-programmable gate array ["FPGA"] semiconductor, an application specific integrated circuit ["ASIC"], or other programmable semiconductor devices as appropriate for a given application) chip, such as a chip developed through a register transfer level ("RTL") design process. In one example, upon receiving a control signal, the motor controller 430 controls and/or operates the switching of a plurality of electronic switches (e.g., FETs), in order to selectively drive the motor 435 at a speed and/or direction. In some embodiments, the motor controller 430 and the motor 435 form a single unit. In other embodiments, the motor controller 430 and the motor 435 are individual components of the valve 400A.

The valve 400A includes a plurality of electrical connectors (e.g., inputs, outputs, input/outputs [e.g., general purpose input/output "GPIO"] etc.). In some embodiments, the plurality of electrical connectors (for example, electrical contacts) includes a battery positive connector A, a battery negative (e.g., ground) connector B, a control signal connector C, an enable signal connector D, and a failsafe (e.g., an error operation) connector E.

Figure 5A:
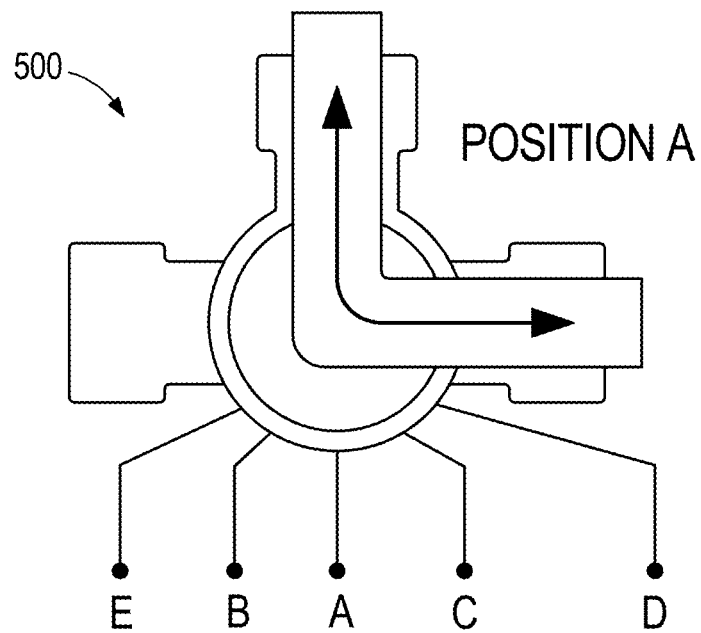
FIG. 5A is a cross-sectional view of the valve of FIG. 4 in a first position, according to one embodiment.
Figure 5B:
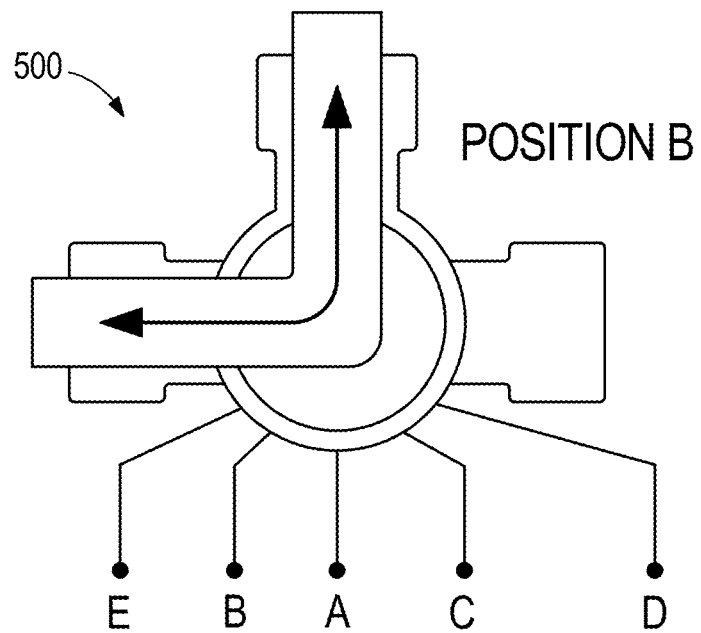
FIG. 5B is a cross-sectional view of the valve of FIG. 4 in a second position, according to one embodiment.

FIGS. 4, 5A, and 5B illustrate the pullout configuration which includes a plurality of electrical connectors A-E (e.g., pins, inputs, outputs, input/outputs, etc.). The single pin connection of the failsafe connector E is advantageous for allowing more options for electrical connection selection, a configurable default position, and saving space. In some embodiments, the plurality of electrical connectors A-E includes the battery positive connector A, the battery negative (e.g., ground) connector B, the control signal connector C, the enable signal connector D, and the failsafe connector E. Although shown in FIGS. 4-5B as connectors A, B, C, D, and E, each connector of the pinout configuration may be assigned to any one of the associated connectors shown in any order. The control signal connector C is configured to be electrically connected to a system controller 450 via electrical contact with a system controller bus 455. In reference to FIG. 4, although the control signal connector is shown as connector C, the control signal connector C may be any one of the plurality of connectors. The system controller bus 455 is configured to be in electrical contact with the valve 400A, a first device 400B, and a second device 400C. The first device 400B and the second device 400C are other components of the vehicle system, for example, a compressor, a fan, or any suitable vehicle component. In some embodiments, the first device 400B and the second device 400C include a similar pinout configuration to the valve 400A. The system controller bus 455 may use one or more known control bus protocols, such as a Controller Area Network (CAN) bus protocol, a Local Interconnect Network (LIN) bus protocol, or other control bus protocol types as required for a given application. In some embodiments, the system controller 450 may be configured to communicate using multiple control bus protocols.

The system controller 450 can include a plurality of electrical and electronic components that provide power, operational control, and protection to the components and modules within the system controller 450 and/or the valve 400A. For example, the system controller 450 includes, among other things, a processing unit (e.g., a microprocessor, a microcontroller, or another suitable programmable device) and a memory. In some embodiments, the system controller 450 is implemented partially or entirely on a semiconductor (e.g., a field-programmable gate array ["FPGA"] semiconductor, an application specific integrated circuit ["ASIC"], or other programmable semiconductor devices as appropriate for a given application) chip, such as a chip developed through a register transfer level ("RTL") design process.

The memory includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The illustrated processing unit is connected to the memory and executes software instructions that are capable of being stored in a RAM of the memory (e.g., during execution), a ROM of the memory (e.g., on a generally permanent basis), or another non-transitory computer readable medium such as another memory or a disc. Software included in some implementations of the valve 400A can be stored in the memory of the system controller 450. The software can include, for example, firmware, one or more applications, program data, filters, rules, one or more program modules, and other executable instructions. The system controller 450 is configured to retrieve from memory and execute, among other things, instructions related to the control processes and methods described herein. In other constructions, the system controller 450 includes additional, fewer, or different components.

In operation, the system controller 450 outputs a control signal to the motor controller 430. The motor controller 430 receives the control signal and operates the motor 435 based on the control signal. In some embodiments, the control signal is a pulse-width modulated signal. The pulse-width modulated signal can have a duty cycle (e.g., 10%, 50%, 100%, etc.). In some embodiments, the duty cycle corresponds to an operating speed of the motor 435 (e.g., 10% of full speed, 50% of full speed, 100% of full speed, etc.).

With continued reference to FIGS. 4-5B, the control signal connector C connects to the system controller bus 455 of the vehicle for communication of control protocol of the valve 400A. In one embodiment, the system controller 450 and system controller bus 455 are the same as a CAN controller and CAN bus and/or LIN controller and LIN bus. In other embodiments, the system controller 450 and system controller bus 455 are separate from the vehicle's CAN controller and CAN bus and/or LIN controller and LIN bus. In some embodiments, the control signal connector C may connect directly to a CAN bus or LIN bus of the vehicle. In some embodiments, the LIN bus may be a sub-bus of the CAN bus of the vehicle. The failsafe connector E may be connected to a ground connection (e.g., the battery negative connector B or other ground connection) or be left open (e.g., not electrically connected to an external connection). The connection of the failsafe connector E determines the failsafe position (e.g., error position) of the valve 400A in the event of control failure (i.e., no control signal from the system controller 450 is received via the control signal connector C or a loss of power occurs). If the failsafe connector E is connected to a ground connection, the failsafe position is set to a first position (FIG. 5A). If the failsafe connector E is left open, the failsafe position is set to a second position (FIG. 5B). Therefore, the failsafe position can be changed based on the electrical connection of the failsafe connector E. The configurable failsafe position allows for very low power consumption when the valve 400A is not in motion as no power is drawn to maintain the valve 400A in the failsafe position (i.e., no power is consumed when the valve 400A is not changing positions). In the event of control failure, the valve 400A returns to the configured default position (e.g., the failsafe position). The battery positive connector A is electrically connected to a positive terminal of a vehicle battery to provide power to the valve 400A. In some embodiments, the battery positive connector A is electrically connected to the system controller 450 or the system controller bus 455 to receive power. The battery negative terminal B is electrically connected to a negative terminal of the vehicle battery to ground the valve 400A. In some embodiments, the battery negative terminal B is electrically connected to a ground terminal of the system controller 450 or the system controller bus 455 to ground the valve 400A. The enable signal connector D is electrically connected to the system controller 450 or the system controller bus 455 to allow the control signal connector C to receive control signals from the system controller 450. For example, the enable signal connector D allows control signals to be received and transmitted by the control signal connector C when the valve 400A is receiving power.

The system controller 450 may further include a communications module. The communications module provides analog and/or digital communications from the system controller 450 to outside devices. In some embodiments, the communications module outputs diagnostic information concerning the system controller 450 and/or other components of the cooling system. The communications module may include an output driver in the form of a digital driver such as SAE J1939, CAN bus, or LIN bus for communicating directly to the vehicle's data bus, or the communications module may generate another suitable analog or digital signal depending on the needs of the specific application. The communication module may further be configured to receive data from one or more data buses within the vehicle, such as SAE J1939, CAN bus, and/or LIN bus.

FIG. 5A is a cross-sectional view of a valve 500 in the first position, according to some embodiments. The valve 500 may be any one of the valves 100, 200, 300, 400A, as described above. In some embodiments, the first position is based on the electrical connection of the failsafe connector E. For example, the motor controller 430 determines that the failsafe connector E is connected to a ground connection by measuring the voltage or current at the failsafe connector E. When the motor controller 430 measures zero volts and zero amps at the failsafe connector E, the motor controller 430 determines that the failsafe connector E is connected to a ground connection. When the motor controller 430 determines that the failsafe connector E is connected to a ground connection, the motor controller 430 sets the failsafe position to the first position. In some embodiments, the first position is set by the motor 435 rotating the central component 135, 235, 335 to direct the flow of fluid and/or gas from the first tube 110, 210, 310 to the second tube 115A, 215A, 315A. FIG. 5B is a cross-sectional view of the valve 500 in the second position, according to some embodiments. In some embodiments, the second position is based on the electrical connection of the failsafe connector E. For example, the motor controller 430 determines that the failsafe connector E is not connected to an external connection by measuring the voltage or current at the failsafe connector E. When the motor controller 430 measures a non-zero voltage and zero amps at the failsafe connector E, the motor controller 430 determines that the failsafe connector E is not connected to an external connection (e.g., open circuit). When the motor controller 430 determines that the failsafe connector E is left open, the motor controller 430 sets the failsafe position to the second position. In some embodiments, the second position is set by the motor 435 rotating the central component 135, 235, 335 to direct the flow of fluid and/or gas from the first tube 110, 210, 310 to the third tube 115B, 215B, 315B. In some embodiments, the failsafe position may be set to the first position or the second position in the event of control failure.

Figure 6:
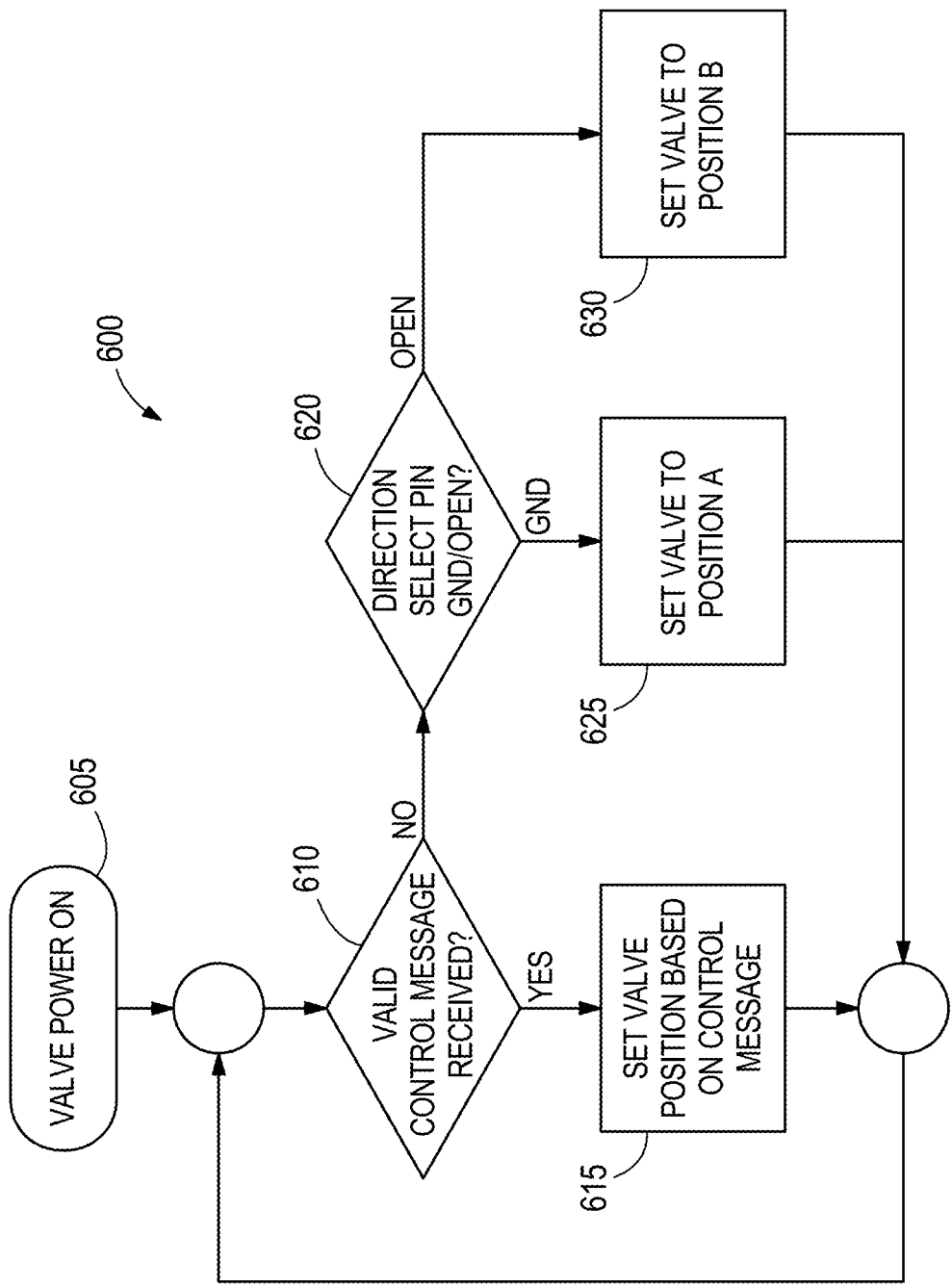
FIG. 6 is a flow chart of a method for controlling an error position of a valve, according to one embodiment.

FIG. 6 is a flow chart of a method 600 for controlling an error position (e.g., failsafe position) of a valve, for example the valve 100, according to some embodiments. Although the method 600 is described herein with reference to the valve 100, the method 600 may be executed to control the error position of the valves 200, 300, 400A. The order of the steps disclosed in the method 600 could vary. For example, additional steps may be added to the process and not all of the steps may be required, or steps shown in one order may occur in a second order. In one embodiment, the motor controller 430 is configured to execute the method 600. In other embodiments, the system controller 450 is configured to execute the method 600 in combination with the motor controller 430. The method 600 begins at step 605 the valve 100 receives power. For example, the valve 100 receives power via the pinout configuration 125. The method 600 then proceeds to step 610.

At step 610, the valve 100 receives a control message from the system controller 450. For example, the motor controller 430 receives a control signal indicative of an operation of an operation of the valve 100 from the system controller 450. The motor controller 430 also characterizes the control message as a first type or a second type. For example, if the control message is the first type (e.g., an invalid control message), the motor controller 430 determines that it has received a control message indicative of power failure, an erroneous control message, or the motor controller 430 does not receive a control message. When the motor controller 430 determines that the control message is the second type (e.g., a valid control message), the method 600 proceeds to step 615.

At step 615, the motor controller 430 transmits a control signal to the motor 435 to set the operating position of the valve 100 based on the valid control message from the system controller 450. For example, the motor controller 430 transmits the control signal to the motor 435 to rotate the central component 135 to the first position. In some embodiments, the motor 435 rotates the central components 135 to the second position based on the control signal. The second position is different from the first position, as described above. In some embodiments, such as embodiments including the valve 200, the motor 435 rotates the central component 135 to a third position based on the control signal. The third position may direct the flow of liquid and/or gas from the first tube 210 to the fourth tube 215C. The third positions is different from the first position and the second position, as described above. After the completion of step 615, the method 600 may return to step 610 to receive a subsequent control message.

When an invalid control message is received at step 610, the method 600 proceeds to step 620. At step 620, the motor controller 430 determines whether the error operation (e.g., failsafe) connector E is electrically open or electrically closed. When the motor controller 430 determines that the error operation connector E is closed (i.e., connected to the ground connection), the method 600 proceeds to step 625. For example, motor controller 430 measures the voltage and current at the error operation connector E and determines that the error operation connector E is electrically connected to the ground connection. At step 625, the motor controller 430 controls the motor 435 to set the position of the valve to the first position. For example, the motor controller 430 transmits a control signal to the motor 435 to rotate the central component 135 to the first position. After the completion of step 625, the method 600 may return to step 610 to receive a subsequent control message.

When the motor controller 430 determines that the error operation connector E is open (e.g., not electrically connected to an external connection) at step 620, the method 600 proceeds to step 630. For example, motor controller 430 measures the voltage and current at the error operation connector E and determines that the error operation connector E is not electrically connected to an external connection (e.g., left open). At step 630, the motor controller 430 controls the motor 435 to set the position of the valve to the second position. For example, the motor controller 430 transmits a control signal to the motor 435 to rotate the central component 135 to the second position. As describe above, the second position is different than the first position. After the completion of step 615, the method 600 may return to step 610 to receive a subsequent control message. The steps of method 600 may be completed as many times as necessary to continuously set the position of the valve 100. Accordingly, the method 600 allows for the valve 100 to be set in either position, first or second, in the event of control failure as an error operation. If a valid control message is received by the motor controller 430, then the motor controller 430 will follow the instruction of the control message.

Although the invention has been described with reference to certain preferred embodiments, variations and modifications exist within the scope and spirit of one or more independent aspects of the invention as described.

What is claimed is:

1. A valve comprising:
   a housing;
   a motor within the housing;
   a pinout configuration with an electrical contact,
      wherein the electrical contact is configured to receive and transmit signals; and
   a motor controller configured to:
      receive power at the valve;
      receive a control message;
      characterize the control message; and
      in response to characterizing the control message as a first type:
         control the motor to set the valve to a first position in response to determining that the electrical contact is electrically closed, and
         control the motor to set the valve to a second position in response to determining that the electrical contact is electrically open.

2. The valve of claim 1, wherein the second position is different than the first position.

3. The valve of claim 2, wherein the valve includes a central component and when controlling the motor to set the valve to the second position, the motor controller is configured to:
   control the motor to rotate the central component to the second position.

4. The valve of claim 3, wherein when determining that the electrical contact is electrically open, the motor controller is configured to:
   determine that the electrical contact is not electrically connected to an external connection.

5. The valve of claim 2, wherein the motor controller is configured to:
   control the motor to set an operating position of the valve in response to characterizing the control message as a second type,
      wherein the operating position is based on the control message being the second type, and
      wherein the operating position is at least one selected from the group consisting of the first position and a second position, the second position different from the first position.

6. The valve of claim 2, wherein the motor controller is configured to:
   control the motor to set an operating position of the valve in response to characterizing the control message as a second type,
      wherein the operating position is based on the control message being the second type, and
      wherein the operating position is at least one selected from the group consisting of the first position, a second position, and a third position, the second position different from the first position and the third position, and the third position different from the first position.

7. The valve of claim 1, wherein the valve includes a central component and when controlling the motor to set the valve to the first position, the motor controller is configured to:
   control the motor to rotate the central component to the first position.

8. The valve of claim 7, wherein when determining that the electrical contact is electrically closed, the motor controller is configured to:
   determine that the electrical contact is electrically connected to a ground connection.

9. A fluid system including the valve of claim 1 and including a pump.

10. A vehicle comprising a cooling system including the fluid system of claim 9.

11. A method for controlling a position of the valve of claim 1, the method comprising:
   receiving power at the valve;
   receiving the control message;
   characterizing, via the motor controller, the control message as the first type; and
   in response to characterizing the control message as the first type:

controlling, via the motor controller, the motor to set the valve to the first position in response to determining that the electrical contact is electrically closed, and controlling, via the motor controller, the motor to set the valve to the second position in response to determining that the electrical contact is electrically open.

12. The method of claim 11, wherein the second position is different than the first position.

13. The method of claim 12, wherein the valve includes a central component and controlling the motor to set the valve to the second position includes:

controlling the motor to rotate the central component to the second position.

14. The method of claim 13, wherein determining that the electrical contact is electrically open includes:

determining, via the motor controller, that the electrical contact is not electrically connected to an external connection.

15. The method of claim 11, wherein valve includes a central component and controlling the motor to set the valve to the first position includes:

controlling the motor to rotate the central component to the first position.

16. The method of claim 15, wherein determining that the electrical contact is electrically closed includes:

determining, via the motor controller, that the electrical contact is electrically connected to a ground connection.

17. The method of claim 11, comprising:

controlling, via the motor controller, the motor to set an operating position of the valve in response to characterizing the control message as a second type, wherein the operating position is based on the control message being the second type, and wherein the operating position is at least one selected from the group consisting of the first position and the second position, the second position different from the first position.

18. The method of claim 11, comprising:

controlling, via the motor controller, the motor to set an operating position of the valve in response to characterizing the control message as a second type, wherein the operating position is based on the control message being the second type, and wherein the operating position is at least one selected from the group consisting of the first position, the second position, and a third position, the second position different from the first position and the third position, and the third position different from the first position.

19. The valve of claim 1, further comprising an electrical port positioned on the housing and configured to couple to an external device, the electrical port including the pinout configuration with the electrical contact.

20. A valve comprising:

a housing;

a motor within the housing;

a pinout configuration with an electrical pin, wherein the electrical pin is configured to receive and transmit signals; and a motor controller configured to:

receive power at the valve;

receive a control message;

characterize the control message; and in response to characterizing the control message as a first type:

control the motor to set the valve to a first position in response to determining that the electrical pin is electrically connected to an external connection, and control the motor to set the valve to a second position in response to determining that the electrical pin is not electrically connected to an external connection.

* * * * *